UNITED STATES PATENT OFFICE.

ALBERT D. LAPOINTE, OF SIOUX CITY, IOWA, ASSIGNOR TO BASTIAN & LAPOINTE, OF SIOUX CITY, IOWA, A FIRM.

PROCESS OF ETCHING BY ELECTROLYSIS ON RELIEF OR INTAGLIO.

984,011.  Specification of Letters Patent.  Patented Feb. 14, 1911.

No Drawing.  Application filed June 6, 1910.  Serial No. 565,219.

*To all whom it may concern:*

Be it known that I, ALBERT D. LAPOINTE, a citizen of the United States, residing at Sioux City, in the county of Woodbury and State of Iowa, have invented certain new and useful Improvements in Processes of Etching by Electrolysis on Relief or Intaglio, of which the following is a specification.

This invention relates to the process of making cuts or prints by means of solutions and the application of electricity to zinc, copper or brass, and also to embossing plates, stencils and other engravings either in relief or intaglio.

The object of the invention is to render the process more expeditious and considerably cheaper.

In the process of etching by means of known solutions it has heretofore been necessary to leave the plates for a considerable time in the solution, while the receptacle containing the solution is agitated, and the attendance of one person is required for each plate. By means of my process several plates may be attended by one person, the plates remain in the solution without agitation and much less time is required for the etching process. The number of plates that can be etched at one time and attended by one person is determined by the number of amperes of electricity generated by the machine and passing through the solution in which the plates are placed.

The prints, which consist in the first instance of impressions of photographic images or line drawings on plates of zinc, are placed in a receptacle or tank containing water with twelve per cent. of nitric acid added to acidulate the water. As much pure nitric acid and zinc is then dissolved in the solution as is necessary to make the solution weigh thirty-five per cent. metal weight, "Baumé test." The plates are then connected with the positive pole of the generator, and a plate of zinc, copper, brass or carbon is connected with the negative pole in the solution. The plates are required to remain in the solution fifteen minutes or more, the depth of relief obtained being determined by the length of time the plates remain in the solution. The current of electricity passing through the solution from the positive to the negative pole of the generator conveys the deposit from the zinc plate at the positive pole to the plate at the negative pole which receives the deposit, causing the relief of the print. For etching copper or brass plates a solution of nitrate of copper of the same proportions and weight is used. When the etching process is completed the prints are removed and the solution may be used again indefinitely for the same purpose. The solution will not deteriorate, as the acid in the solution is not taken up by the plates.

Having described my invention, what I claim as new and desire to secure by Letters Patent, is—

1. The process of etching on metals, which comprises applying a current of electricity to prints on zinc, copper or brass, placed in a solution of a nitrate salt of the metal used, substantially as described.

2. The process of etching on metals, comprising the application of the positive pole of an electric current to prints on zinc, copper or brass plates in a solution of a nitrate salt of the metal used, and connecting the negative pole of the current to an electrode in the solution, substantially as herein described.

3. The process of etching on metals, comprising placing prints of zinc, copper or brass in a solution of water containing a nitrate salt of the metal used in the proportions specified, then connecting the prints with the positive pole of an electric current and attaching an electrode to the negative pole in the solution, substantially as herein described.

In witness whereof I have hereunto subscribed my name in the presence of two witnesses.

ALBERT D. LAPOINTE.

Witnesses:
H. C. GARDINER,
J. S. NELSON.